Figure 1:
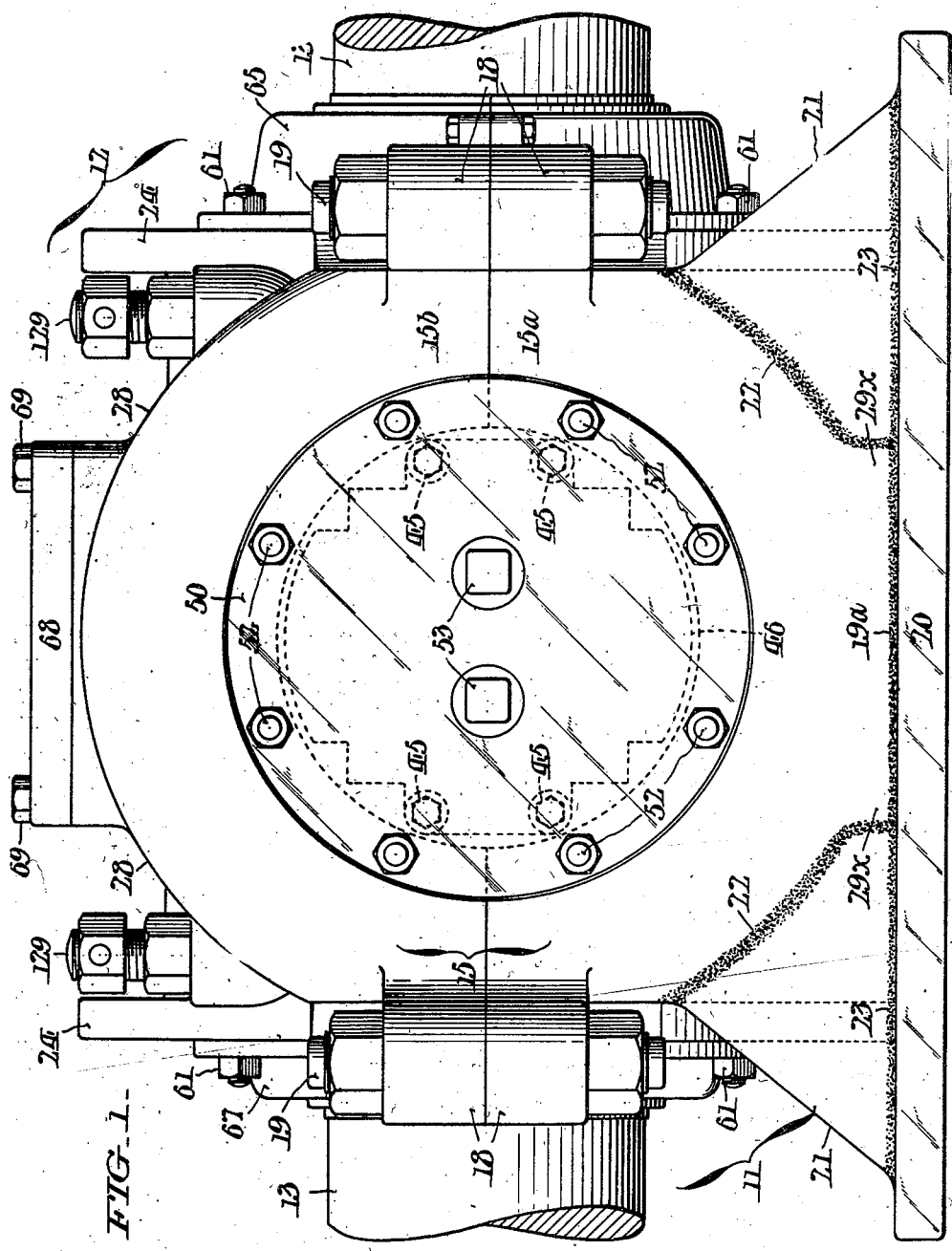

March 23, 1943.  H. A. S. HOWARTH  2,314,703
BEARING
Filed Aug. 4, 1940  6 Sheets-Sheet 3

WITNESSES:
Thomas W. Kerr, Jr.
William Bell, Jr.

INVENTOR:
Harry A. S. Howarth,
BY Paul & Paul
ATTORNEYS.

March 23, 1943. H. A. S. HOWARTH 2,314,703
BEARING
Filed Aug. 4, 1940 6 Sheets-Sheet 4
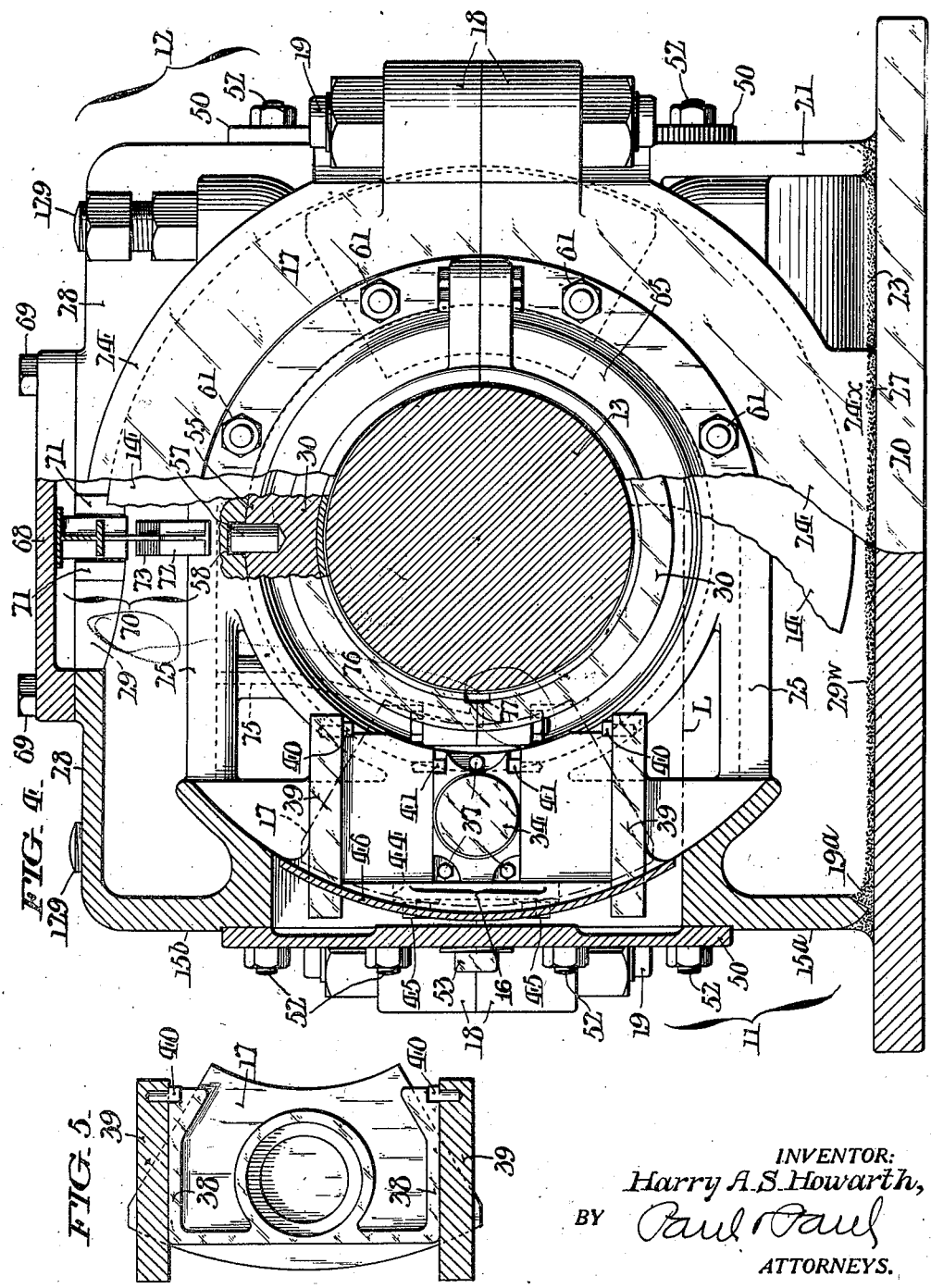
INVENTOR:
Harry A. S. Howarth,
BY
ATTORNEYS.

March 23, 1943.　　　H. A. S. HOWARTH　　　2,314,703
BEARING
Filed Aug. 4, 1940　　　6 Sheets-Sheet 5
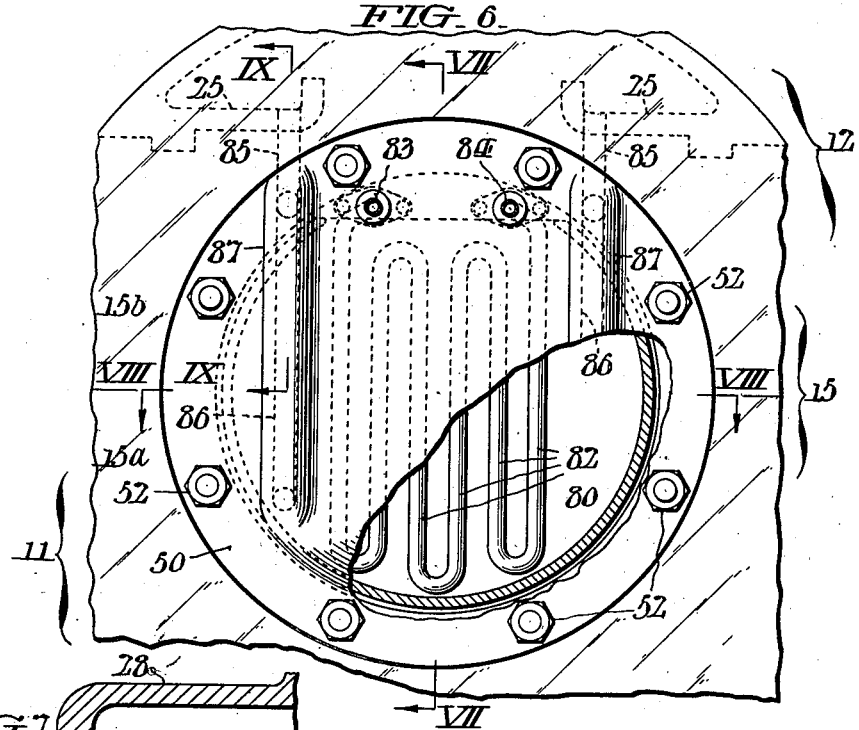
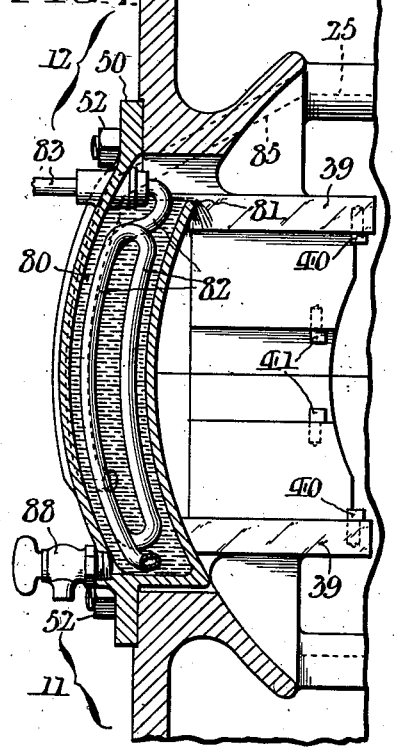
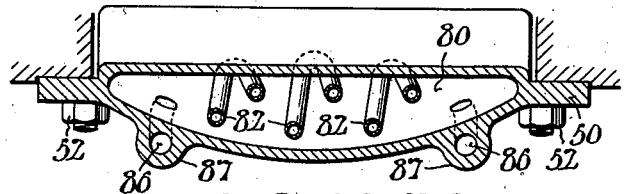
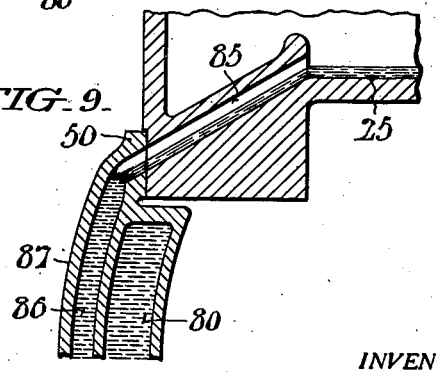
INVENTOR:
Harry A. S. Howarth,
BY Paul & Paul
ATTORNEYS.

March 23, 1943. H. A. S. HOWARTH 2,314,703
BEARING
Filed Aug. 4, 1940 6 Sheets-Sheet 6
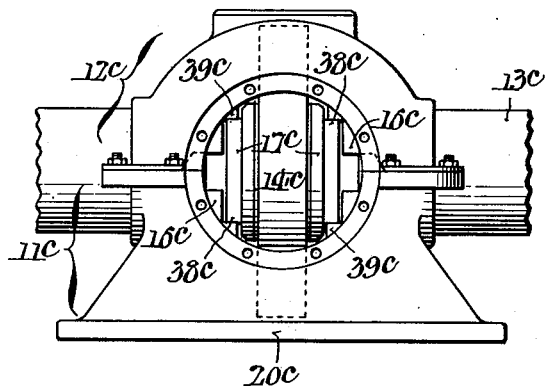
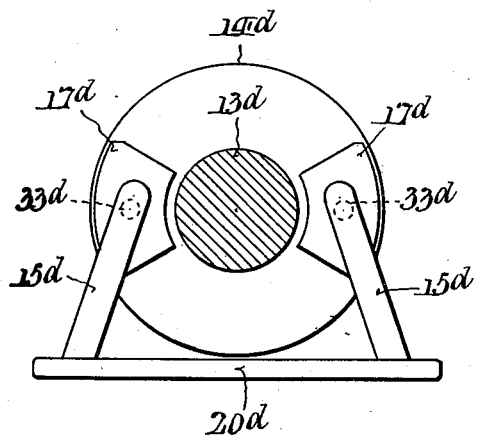
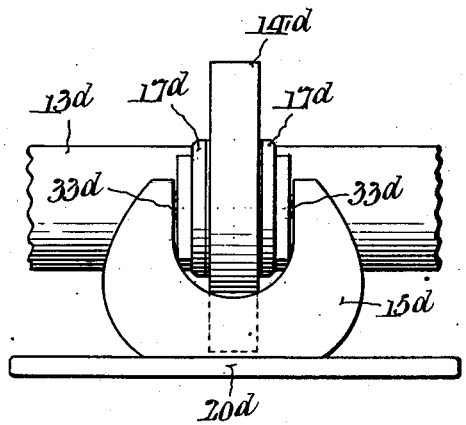
INVENTOR:
Harry A. S. Howarth,
BY
ATTORNEYS.

Patented Mar. 23, 1943

2,314,703

UNITED STATES PATENT OFFICE 2,314,703
BEARING

Harry A. S. Howarth, Philadelphia, Pa.

Application August 4, 1940, Serial No. 351,386

12 Claims. (Cl. 308—160)

This invention relates to bearings for shafts and the like, including thrust bearings and guide bearings, which may be associated in one structure. General aims of the invention are to improve and simplify the construction of such bearings, and to facilitate and cheapen their manufacture; to facilitate inspection of important parts, as well as the assembly and taking apart of the bearing; and to provide for lubricating the bearing and for cooling the lubricant in an advantageous manner. The invention is especially adaptable for thrust bearings employing thrust shoes mounted with freedom to tilt, and for marine bearings, and I have hereinafter explained it with particular reference to a propeller thrust bearing with tiltable shoes.

Important features of the bearing hereinafter described are the structure for resisting end thrust of the shaft, and the accessibility of various parts. Accordingly, its main strength members may consist of bent girders (preferably in the form of rings or half-rings) arranged substantially upright at opposite sides of the shaft, and attached to the base of the bearing structure. The thrust collar of the shaft (which may be either an integral flange, or a separate part secured and keyed fast on the shaft) revolves between these bent girders or girder rings, and may be (partly) accommodated in their openings. The stationary thrust bearing shoes that coact with one or both sides of the shaft collar (if the thrust is liable to reversal, as in the case of a propeller shaft) are sustained by the girder rings—or by supports extending inward from them—and may be inspected or removed through the girder ring openings. By placing the bearing shoes diametrically opposite with respect to the shaft, eccentricity of the end thrust affecting the shaft collar is avoided, which facilitates use of a separate collar bolted to the shaft.

The bent girders or girder rings may be connected to the base and braced (and also interconnected) by transverse walls or webs at each end of the bearing. In addition, the girder rings and the transverse walls may all be interconnected and braced together by a top wall. Besides the thrust bearing shoes, a guide or journal bearing for the shaft may be provided (if desired) at either end of the structure—or even at both ends—and may be supported by the end walls or the girder rings, or both. In addition to the side openings of the girder rings and the openings in its end walls for the shaft, there may also be an opening in the top wall. All the openings may be provided with removable covers, thus making the structure a closed housing for the thrust collar, bearings, and associated parts, and facilitating lubrication.

In constructing the housing, I generally prefer to cast it in upper and lower halves divided on an axial plane, and each including thrust support portions for the thrust bearing shoes. Preferably (substantial) counterparts cast from the same pattern, these upper and lower halves may be trimmed and finished somewhat differently, and the lower one may be suitably attached or welded to an initially separate base. On assembling the halves, their girder ring and thrust support portions may be bolted together so as to develop their full cooperative strength. Such a welded construction facilitates variations in design, such as the proportions or height of the base, the height of the bearing axis above it, etc. But while welding is, in general, the preferred mode of attaching the housing or the lower housing half to the base, they may if preferred be integrally attached to one another by casting them together in one casting.

When the housing halves are cast exactly alike, the top wall of the lower half may be at least partly trimmed away before the base is welded on; for when welded to the edges of the ring girder portions and of the end walls, the base plate serves all the purposes of the top as regards both strength and closure of the housing at the bottom. Or, if preferred, a portion of the mold cavity may be filled up before the bottom half is cast, to eliminate the excess metal without necessity for subsequent trimming of the casting, which is thus only substantially a counterpart of the upper half. In either case, the machine work done in finishing the two housing halves may be somewhat different, according to their different functions in the bearing.

In some cases, the lower housing half may embody all the thrust support and strength members of the structure, and the upper half may be in effect only a cover, of relatively thin sheet metal.

Various other features and advantages of the invention will appear from the description of species and forms of embodiment, and from the drawings. All the features and combinations shown or described are of my invention, so far as novel.

Figure 2:
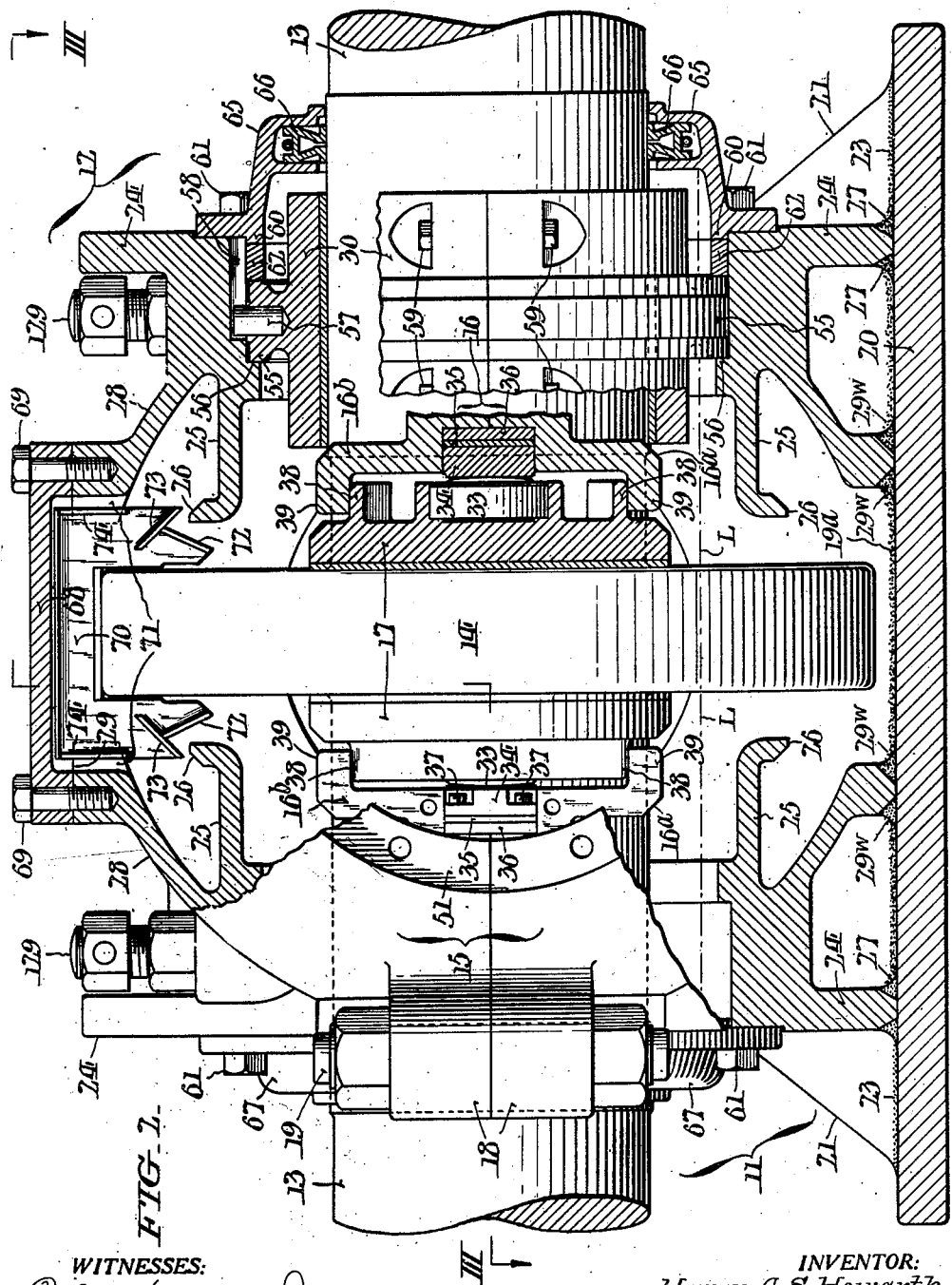
Figure 3:
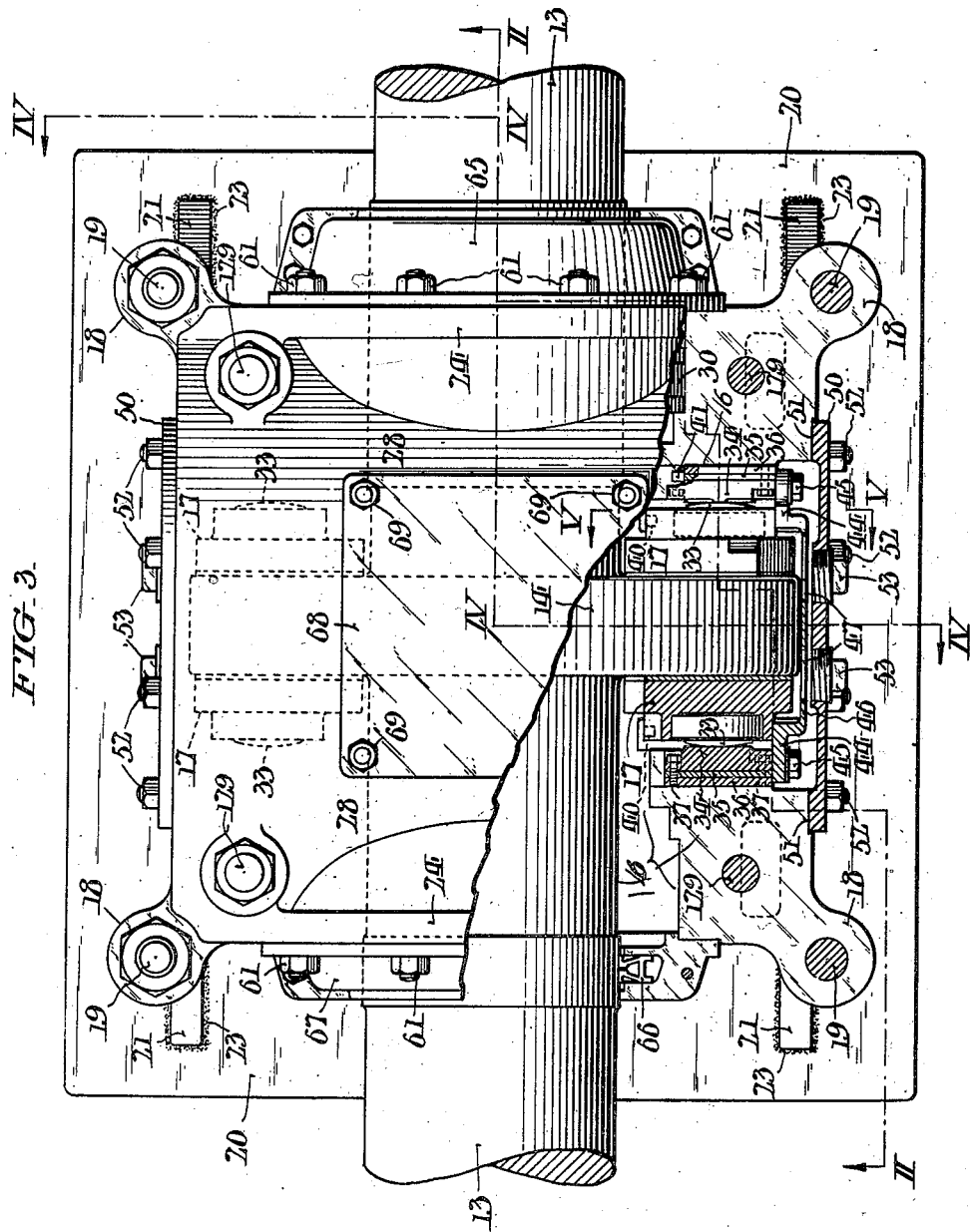

In the drawings, Fig. 1 is a side view of a bearing embodying my invention in one form of construction; Fig. 2 is a similar view with most of the bearing housing broken away and in vertical section as indicated by the line and arrows II—II in Fig. 3, and with some of the internal parts also in vertical section; Fig. 3 is a plan view of the bearing with a portion of its housing broken away, and with some of the internal parts in horizontal section as indicated by the line and arrows III—III in Fig. 2; Fig. 4 is an end view of the bearing, with slightly more than one side of its housing broken away and in vertical section as indicated by the line and arrows IV—IV in Fig. 3, and with a thrust collar that appears in Fig. 3 partly broken away; and Fig. 5 is a fragmentary view of the back of one of the thrust bearing shoes with the associated supporting structure in section as indicated by the line and arrows V—V in Fig. 3.

Fig. 6 is a fragmentary side view of the bearing structure, illustrating a modified construction providing for cooling of the lubricant, a portion of the side cover (corresponding to the cover in Fig. 1) being broken away; Fig. 7 is a fragmentary vertical sectional view taken as indicated by the line and arrows VII—VII in Fig. 6; Fig. 8 is a horizontal sectional view taken as indicated by the line and arrows VIII—VIII in Fig. 6; and Fig. 9 is a fragmentary sectional view taken as indicated by the line and arrows IX—IX in Fig. 6.

Fig. 10 is a somewhat diagrammatic side view of a modified bearing housing, with the side cover removed; Fig. 11 is a diagrammatic side view of another modified construction, showing the shaft, the bearing shoes, and the essential thrust transmitting structure of the bearing, but omitting the housing and other accessory features; and Fig. 12 is a corresponding diagrammatic end view.

In general, it is to be understood that the bearing is alike at both sides of the shaft axis, and that all the parts shown and described are or may be duplicated at both sides of the axis, even though in some instances the exterior housing is broken away on one side only, and only the internal parts in one side are illustrated or specifically referred to.

As shown in Figs. 1, 2, 3, and 4, the bearing housing consists of lower and upper halves 11 and 12, divided on a horizontal plane through the axis of the shaft 13 and its thrust collar or flange 14. In this instance, the main strength-members of the structure consist of vertical rings 15 (parallel with the shaft 13) that are divided into lower and upper halves 15a, 15b, each with thrust-support portions 16a, 16b extending inward therefrom to form supports 16 for sustaining thrust-bearing shoes 17 that coact with the shaft collar 14. Bolting flanges or lugs 18 attached directly to the girder ring halves 15a, 15b take bolts 19 for securing the lower and upper halves 11, 12 together so as to develop their full strength in cooperation. The lower half-ring girders 15a, 15a are attached or welded at 19a to a base 20, in the form of a heavy steel plate. Corner gusset web-plates 21 are attached or welded to the girder ring portion 15a at 22 to form extensions thereof, and are also attached or welded to the base 20 at 23, so that they brace the rings 15, 15 to the base against the stresses due to the end thrust of the shaft 13. Transverse webs or end walls 24, 24 interconnect the girder ring portions 15a, 15a of the lower housing half 11. As shown in Figs. 2 and 4, there is a transverse flange 25 (with downturned edge 26) on the inner side of each end wall 24, which serves to brace and strengthen the end wall and to fortify the connection between the ring halves 15a, 15a. The webs 24, 24 are shown attached or welded to the base 20 at 27, so as to brace the ring portions 15a, 15a transversely relative to the base. The upper housing half 12 is just like the lower as regards its end walls or webs 24, 24 (and flanges 25 with upturned edges 26) and their relations to its ring portions 15b, 15b. The end walls 24, 24 of both housing valves 11, 12 have semi-circular "cut-outs" that provide end openings for the shaft 13 when the halves are assembled. The upper housing half 12 is shown with a top wall 28 (in the main curved concentrically with the girder rings 15, 15) that interconnects its ring portions 15b, 15b and its end walls 24, 24 and braces them all together, and this top 28 has a central opening 29 therein, Fig. 2. Besides the bolts 19 through the flanges or lugs 18, there are stud bolts 129 tapped into the lower casing half 11 and extending up through the upper half 12 to secure the latter to the lower half, Figs. 1, 2, 3, and 4. In manufacture, the upper and lower housing halves 11, 12 may be steel castings made from the same pattern, and may initially be exact or substantial counterparts of one another, as hereinbefore explained. Preferably, cores are placed in the mold for the lower housing half 11 so as to extend its central opening (referred to as 29 in the description of the upper half) the full width of the housing, and the longer edges of this central opening are welded to the base 20 as indicated at 29w in Figs. 2 and 4. As its shorter edges are also welded to the base 20 at 19a, as already explained, the lower portion of the housing forms a fluid-tight reservoir, useful in the lubrication of the bearing. The mold is otherwise modified to fill out the metal of the girder ring portion 15a as indicated at 29x, Fig. 1, and the metal of the lower end walls 24 is similarly filled out as indicated at 24x, Fig. 4, thus increasing the lengths and strength of the welds 27.

As here shown, there is a guide or journal bearing 30 for the shaft 13 at one side of the thrust collar 14, mounted in the shaft opening of its end wall 24 which is at the right in Fig. 2.

As shown in Figs. 3 and 4, each of the bearing supports 16 projects slightly from the girder ring 15 toward the thrust collar 14, as well as inward toward the shaft 13. Each thrust bearing shoe 17 is mounted with freedom to tilt or rock (relative to the support 16) circumferentially with reference to the axis of the shaft 13, and also radially relative thereto, and, indeed, in all directions. To permit such universal tilting of the shoe 17, it is provided with a spherical-surfaced pivotal support 33 at its back, here shown (Figs. 2 and 3) as a separate circular part inset in a circular socket in the back of the shoe. This spherical-surfaced shoe support 33 bears and rocks against a stationary plane, flat bearing 34, here shown as a separate part seated in a radial groove in the support 16. As shown in Figs. 2 and 3, the part 34 is backed with a couple of spacing plates 35, 36 secured thereto by bolts 37. To prevent displacement of the bearing shoe 17 circumferentially around the shaft 13 while permitting it to rock freely, parallel end shoulders 38, 38 at its rear engage between corresponding shoulders 39, 39 on the support 16, Figs. 2 and 5. As the rocking movement required for the shoe 17 in all directions is very slight, small clearances between the shoulders 38, 39 permit it to take place freely.

As shown in Figs. 3, 4, and 5, the radial position of the bearing shoe 17 is determined by engagement of the (notched) inner ends of its shoulders 38, 38 against stop projections 40, 40 on the support shoulders 39, 39, and the radial position of the bearing 34 in its groove is similarly determined by engagement of shoulders on the notched inner end of bearing 34 against stop projections 41, 41 on the sides of its groove. Outward movement or displacement of the bearing shoe 17 and of the bearing 34 is normally prevented by engagement of the said bearing 34 and of the rear portion of the shoe 17 against a retainer 44 removably secured to the thrust support 16 by bolts or screws 45. As best shown in Figs. 3 and 4, the retainers 44, 44 for the pair of opposed shoes 17, 17 are formed by thickened flat flanges at the opposite margins of a plate 46 that is cylindrically curved concentrically with the shaft collar 14. The retainer plate 46 may have peep-holes 47, 47 therein, in line with the coacting faces of the thrust collar 14 and of the shoes 17, which are here shown as surfaced with a layer of babbitt or other suitable metal. As best shown in Figs. 1, 2, and 3, each retainer plate 46, pair of shoes 17, 17, shaft 13, and pair of bearings 34, 34 all lie directly behind the opening of the corresponding ring girder 15 of the bearing housing, so as to be readily withdrawn laterally outward through said opening. Normally, this opening may be closed by a cover plate 50 removably secured against a corresponding annular seat 51 on the outer surface of the housing, as by means of bolts 52. The cover plate 50 may have inspection openings directly in line with the peep-holes 47, 47 of the retainer plate 46, to permit examination of the operating condition of the bearing without removing the cover, these openings being normally closed by screw-plugs 53. The cover plate 50 normally closes the side opening of the girder ring 15 against escape of lubricant, when the shaft 13 is revolving (and so, also, does the plate 46 to a degree), but is removable (like the plate 46) to permit removal of the bearing shoe 17 when the shaft is at rest.

As shown in Figs. 2 and 4, the guide bearing 30 for the shaft 13 has an external annular ridge or flange 55 which fits snugly (but not tightly) in the right hand end-opening of the bearing housing, against an annular shoulder 56. Rotation of the bearing 30 relative to the housing may be prevented by any suitable means, such as a key 57 projecting from the bearing ridge 55 and engaged in a corresponding keyway or groove 58 in the metal of the housing. As here shown, the bearing 30 is made in semi-circular halves divided on a horizontal axial plane, and detachably secured together by bolts 59. Preferably, these guide-bearing halves are each surfaced with a layer of babbitt or other suitable metal. The bearing 30 may be held in place by a retaining ring 60 (also in semi-circular halves) that is removably secured against an annular seat on the end of the bearing housing, as by means of bolts 61. A spacing ring 62 (likewise in semi-circular halves) may be interposed between the retaining ring 60 and the ridge 55 of the bearing 30. As shown in Figs. 1, 2, 3, and 4, the right-hand end opening of the bearing housing around the shaft 13 is closed by an annular cover 65 (in semi-circular halves) that is provided with suitable packing 66 to prevent leakage of oil along the shaft, and extends some distance to the right from the bearing housing to accommodate and enclose the corresponding end of the bearing 30. As shown, the retaining ring 60 already mentioned is a flange integral with the cover 65, and serves to attach the latter to the bearing housing. The left-hand end opening of the bearing housing may be closed by an annular cover 67 similar to the cover 65, but not shown as extended any substantial distance to the left of the housing, since there is no guide bearing to be accommodated in this cover.

As will be seen from Figs. 1, 2, 3, and 4, the bearing housing structure is not only symmetrical transversely, at opposite sides of a vertical axial plane, but is also symmetrical fore and aft, at opposite sides of the plane of the thrust collar 14, which simplifies the making of patterns and the machine work on the housing. As shown in Figs. 1, 2, and 3, the finished inner edges of the side openings of the housing (inside the girder rings 15, 15), and the finished inner surfaces of its end openings (one of which forms the seat for the guide-bearing flange 55) are of the same diameter, which allows them to be finished with the same drill jig, resulting in economy in tooling. The top opening in the upper housing half 12 is normally closed by a cover plate 68 detachably secured thereto, as by bolts 69.

As here shown, the lower portion of the bearing housing provides a reservoir for a pool of lubricant (oil) to a level (indicated by the line L in Figs. 2 and 4) such as to submerge the lower portion of the thrust collar 14, which consequently carries up adherent oil as it revolves; and provision is made for taking this oil from the collar in the upper portion of the housing and delivering or transmitting it to the friction areas to be lubricated, including the acting faces of the thrust bearing shoes 17, and the coacting surfaces of the shaft 13 and its guide bearing 30. For taking the oil from the revolving thrust collar 14, there is shown in Figs. 2 and 4, a scraper (plate) 70 which lies in the vertical axial plane of the shaft 13. This scraper 70 has a cut-out that conforms substantially to the margin of the thrust collar 14, and is mounted in vertical guideways 71 at opposite sides of the top opening 29, so as to rest by gravity on the periphery of the thrust collar 14. It has facial ridges or flanges 72, 73, 74 (both fore and aft of the collar 14, as well as at both faces of the plate) that divide the supply of oil that is continually scraped from the top edge and from each side of the thrust collar 14 into two streams. One of these oil streams is directed downward (by the flange 72) across the whole radial width of the thrust collar 14, resulting in an oil film between its face and the corresponding thrust bearing shoe 17; and the other oil stream is directed downward and outward (by the flange 73) toward the corresponding end of the bearing housing. For receiving this latter oil stream, a transverse trough is shown in the upper portion of the housing at each end, formed by the flange 25 with its upturned edge 26 (already mentioned) at the corresponding end of the upper housing half 12. Oil overflowing from the ends of the trough falls on the upper ends of the bearing shoes 17 and works down between the upper shoulders 38, 39, thus reaching the shoe bearings 33, 34 and the shoulders 38, 39 at the lower ends of the shoes. Oil to lubricate the guide bearing 30 is led down from the trough 25 through a duct 75 in the end wall 24 of the housing and a duct 76 in the fore and aft mid-plane of the bearing 30, Fig. 4 to a longitudinal oiling groove 77 formed in the bearing along the junction of its upper and lower halves. Of course oil may be thus supplied at both sides of the shaft 13.

In order to keep down the temperature of the bearing, it may be desirable to specially cool it; and this may be done by cooling the lubricant within the bearing housing, for which purpose, an auxiliary cooling reservoir or (small) tank may be arranged at the side of the housing. As shown in Figs. 6–9, such a reservoir 80 is provided on a side cover 50, at its inner side. This auxiliary reservoir 80 is shown open at the top, so that oil may be discharged from it into the oil pool in the main reservoir (at the bottom of the bearing housing) by overflowing at 81 over the upper edge of the inner wall of the auxiliary reservoir; and provision is preferably made for introducing the warm oil into a region of the reservoir 80 remote from the point of discharge, so as to insure circulation as well as a sufficient dwell of the oil in the auxiliary reservoir to effect the desired reduction in temperature. Any suitable cooling means may be provided for the oil in the reservoir 80, such as a serpentine water circulating tube 82 connected between water inlet and discharge pipes 83, 84 near the upper margin of the cover 50, and extending up and down in the reservoir 80 in a series of elongated convolutions.

As shown in Figs. 6, 7, and 9, a duct 85 for supplying oil to the reservoir 80 leads downward and outward on a slope from the end of each transverse trough 25 in the upper housing half 12, in the thickness of the metal forming the corresponding girder ring portion 15b, and opens out through the seat of the cover 50 on the bearing housing. Corresponding ducts 86 are provided on the cover 50, in the thickness of metal afforded by external ridges 87 thereon. The upper ends of the ducts 86, 86 open through the seating surfaces on the margin of the cover 50, in registry with the lower ends of the ducts 85 in the housing, while the lower ends of the ducts 86, 86 open into the lower portion of the reservoir 80, Figs. 6 and 7. Thus the introduction of warm oil through ducts 85, 86 into the bottom of the reservoir 80 is remote from the discharge of oil by overflow at the top of the reservoir, at 81, and there is ample opportunity for the oil to be cooled by the coil 82 during its slow ascent in the reservoir 80. Furthermore, the oil in the reservoir 80 is relatively quiescent, so that any small amount of water leaking into it from the cooling coil 82 (or its joints at 83, 84) settles to its bottom and remains there, and does not get into the main oil in the bottom of the bearing housing. As the joints between the oil ducts 85 in the upper housing half 12 and the ducts 86 in the cover 50 coincide with the joint between the housing and the cover, they are made tight by usual gasket means (not shown) employed in this main joint. Accumulation of duct water may be discharged from time to time through the valved draw-off 88 at the bottom of the reservoir 80, Fig. 7.

Fig. 10 illustrates a housing construction different from that of Figs. 1-4, in that the actual supports 16c for the thrust bearing shoes 17c are formed entirely on the girder half ring 15c of the lower housing half 11c, while the upper housing half 12c is a mere light sheet-metal cover that retains the lubricant, excludes dirt, and prevents undesired access to the moving parts, and may also carry upper shoulders 39c for coacting with the upper bearing shoes shoulders 38c in preventing upward displacement of the bearing shoes 17c. In other respects, the construction may be substantially like that in Figs. 1-5; and various parts and features are marked with the same reference characters as in Figs. 1-5 (with addition of a distinctive letter), as a means of dispensing with repetitive description.

Figs. 11 and 12 illustrate the essentials of a bearing structure in which the girder half-rings 15d upstanding from the base 20d are inclined inward toward one another, so that the centers of the shoe bearings 33d lie in the fore and aft planes of these half-ring girders, instead of being offset inward from these planes, as shown especially in Figs. 3 and 4. Various parts and features in Figs. 11 and 12 are marked with the same reference numerals as in Figs. 1-4 (with addition of a distinctive letter) as a means of dispensing with repetitive description.

Having thus described my invention, I claim:

1. A thrust bearing structure for a horizontal shaft comprising as main strength members half-ring girders standing substantially upright at opposite sides of the shaft, when the latter is in place, substantially parallel therewith; a base attached to the lower portions of said half-ring girders; and thrust bearing shoes in the horizontal plane of the shaft axis supported by the upper ends of said half-ring girders at the openings between them, for coacting with a thrust collar or flange on the shaft, and removable laterally through said openings.

2. A thrust bearing structure for a horizontal shaft comprising as main strength members girder rings standing substantially upright at opposite sides of the shaft, when the latter is in place, substantially parallel therewith; a base attached to the lower portions of said girder rings; and thrust bearing shoes supported by said girder rings at their openings, for coacting with a thrust collar or flange on the shaft, and removable laterally through said openings.

3. In a thrust bearing, the combination with a horizontal shaft having a thrust collar or flange, and tilting bearing shoes at opposite sides of the shaft, substantially at the level of its axis, for coacting with said thrust collar; of supports sustaining said shoes against the end thrust of the shaft, while allowing them to tilt relative to said thrust collar, and having shoulders for engaging the shoes to prevent them from shifting circumferentially around the shaft while leaving them free for outward removal therefrom; and removably mounted retainers normally engaging outside the shoes and preventing outward displacement of the latter, but when removed permitting withdrawal of the shoes outward from the shaft.

4. In a thrust bearing, the combination with a horizontal shaft having a thrust collar or flange, and tilting bearing shoes at opposite sides of the shaft, for coacting with said thrust collar; of a housing enclosing said collar and shoes, as well as the associated portion of the shaft, and having openings in its opposite sides adapted to pass said shoes, with covers for said openings; supports sustaining said shoes in said housing against the end thrust of the shaft, while allowing them to tilt relative to said thrust collar, and having shoulders for engaging the shoes to prevent them from shifting circumferentially around the shaft while leaving them free for outward removal therefrom; and retainers in said housing removably mounted and normally engaging outside the shoes and preventing outward displacement of the latter, but themselves removable through said side openings of the housing, and when removed permitting withdrawal of the shoes through said openings.

5. The combination with a horizontal shaft having a thrust collar or flange; of a housing enclosing said thrust collar and a portion of said shaft and having end openings for the latter, and also having opposite side openings adjacent the periphery of said thrust collar; thrust bearing shoes at opposite sides of said shaft for coacting with said collar, sustained against end thrust of the shaft by said housing and removable laterally through its said side openings; and guide bearing means for said shaft in an end of said housing supported by the latter, and removable along the shaft through the corresponding end opening of said housing.

6. The invention as set forth in claim 5 including a detachable annular cover for closing the last-mentioned end opening of said housing around the shaft, and circumferentially enclosing an end of said guide bearing.

7. In a thrust bearing, the combination with a horizontal shaft having a thrust collar or flange; of a housing enclosing said collar and the associated portion of the shaft, and having opposite side openings adjacent the periphery of said thrust collar, and also provided with a lubricant reservoir for containing a pool of lubricant submerging the lower portion of said collar, which consequently carries up adherent lubricant as it revolves; tilting bearing shoes at opposite sides of said shaft coacting with said thrust collar, and removable laterally through said side openings of said housing; means in said housing for taking the lubricant from said collar and delivering it to the friction areas of said tilting bearing shoes; and means normally closing said side openings against escape of lubricant, when the shaft is revolving, but removable to permit removal of said bearing shoes when the shaft is at rest.

8. In a thrust bearing, the combination with a horizontal shaft having a thrust collar or flange, tilting bearing shoes at opposite sides of the shaft, for coacting with said thrust collar, and a housing enclosing said collar and shoes, as well as the associated portion of the shaft, and provided in its bottom with a main oil reservoir for containing a pool of oil submerging the lower portion of said collar, which consequently carries up adherent oil as it revolves; of an oil cooling reservoir in the side of the housing at a higher level, with discharge therefrom into the aforesaid main reservoir; a cooler associated with said oil-cooling reservoir for cooling the oil therein, and connections for circulating cooling fluid through said cooler; means in said housing for taking oil from said collar and delivering it into the lower portion of said oil-cooling reservoir; and means for discharging from the lower portion of said oil-cooling reservoir fluid leaking thereinto from said cooler.

9. In a thrust bearing, the combination with a horizontal shaft having a thrust collar or flange; of a housing enclosing said collar and shoes, as well as the associated portion of the shaft, and having a side opening adjacent the periphery of said thrust collar, and also provided with a main lubricant reservoir for containing a pool of lubricant submerging the lower portion of said collar, which consequently carries up adherent lubricant as it revolves; a thrust bearing shoe alongside said shaft coacting with said collar, and removable laterally through said side opening of said housing; a lubricant-cooling reservoir mounted in the side of said housing outside said collar and bearing shoe and discharging into the aforesaid main reservoir, and removable laterally through said side opening to permit removal of said bearing shoe as aforesaid; and means in said housing for taking the lubricant from said collar and delivering it to said cooling reservoir.

10. In a thrust bearing, the combination with a horizontal shaft having a thrust collar or flange, tilting bearing shoes at opposite sides of the shaft, for coacting with said thrust collar, and a housing enclosing said collar and shoes, as well as the associated portion of the shaft, and provided with a main lubricant reservoir for containing a pool of lubricant submerging the lower portion of said collar, which consequently carries up adherent lubricant as it revolves, and also having a lateral opening adjacent said collar and bearing shoes; of an external cover for said lateral opening of said housing, with a lubricant-cooling reservoir mounted thereon and discharging from its upper portion into said main reservoir; means in the upper part of said housing for taking the lubricant from said collar and delivering it toward an end of the housing; and means for receiving the lubricant delivered toward the end of the housing as aforesaid and transmitting it to the lower portion of said lubricant-cooling reservoir.

11. A thrust bearing structure for a horizontal shaft comprising a housing cast in substantially counterpart upper and lower halves divided on an axial plane, and each including as main strength members, half-ring girders substantiallyl upright at opposite sides of the shaft when the latter is in place, with their axis at right angles to the shaft, providing supports to sustain thrust bearing shoes in contact with a thrust collar or flange on the shaft, the side openings in the girders being of a size to permit the shoes to be withdrawn through them, and the housing having end openings for the shaft of substantially the same size as said side openings; bolting flanges for each housing half attached to the ends of its half-ring girders, and abutting against corresponding bolting flanges of the other housing half; and a base for the lower housing half connected to its said half-ring girders.

12. A thrust bearing structure for a horizontal shaft comprising a housing cast in substantially counterpart upper and lower halves divided on an axial plane and each including as main strength members, half-ring girders substantially upright at opposite sides of the shaft when the latter is in place with their axis at right angles to the shaft, providing supports to sustain thrust bearing shoes in contact with a thrust collar or flange on the shaft, the side openings in the girders being of a size to permit the shoes to be withdrawn through them, and the housing having end openings for the shaft of substantially the same size as the side openings, said side and end openings being so proportioned that upon lifting the upper housing half by a distance corresponding to substantially half the shaft diameter, it can be removed sidewise without fouling the thrust collar or flange on the shaft, and that upon lifting the shaft subsequently by a like distance it can be removed sidewise without fouling of the lower casing half by said thrust collar or flange; bolting flanges for each housing half attached to the ends of its half-ring girders, and abutting against corresponding bolting flanges of the other housing half; and a base for the lower housing half connected to its said half-ring girders.

HARRY A. S. HOWARTH.